(12) United States Patent
Wiest (10) Patent No.: US 11,913,770 B2
(45) Date of Patent: Feb. 27, 2024

(54) MEASURING SYSTEM (71) Applicant: M & H Inprocess Messtechnik GmbH, Waldburg (DE)

(72) Inventor: Christoph Wiest, Weingarten (DE)

(73) Assignee: M & H Inprocess Messtechnik GmbH, Waldburg (DE)

( * ) Notice: Subject to any disclaimer, the term of this patent is extended or adjusted under 35 U.S.C. 154(b) by 0 days.

(21) Appl. No.: 17/651,592

(22) Filed: Feb. 18, 2022

(65) Prior Publication Data

US 2022/0170733 A1    Jun. 2, 2022

Related U.S. Application Data

(63) Continuation of application No. PCT/EP2020/070132, filed on Jul. 16, 2020.

(30) Foreign Application Priority Data

Aug. 22, 2019   (DE) .................... 10 2019 122 655.4

(51) Int. Cl.
  *G01B 11/00*     (2006.01)
  *G01B 5/008*     (2006.01)
  *G01B 21/04*     (2006.01)

(52) U.S. Cl.
  CPC ............ *G01B 11/005* (2013.01); *G01B 5/008* (2013.01); *G01B 21/047* (2013.01)

(58) Field of Classification Search
  CPC ..... G01B 11/005; G01B 5/008; G01B 21/047

(Continued)

(56) References Cited

U.S. PATENT DOCUMENTS 5,118,956 A * 6/1992 Dunning ................ G01B 5/012
                                                                250/227.21
5,152,072 A * 10/1992 McMurtry ............. G01B 5/012
                                                                33/DIG. 13

(Continued)

FOREIGN PATENT DOCUMENTS

CN      102211294 A      10/2011
CN      202028972 U      11/2011

(Continued)

OTHER PUBLICATIONS

German Search Report (Application No. 10 2019 122 655.4) dated Apr. 24, 2020.

(Continued)

*Primary Examiner* — Isiaka O Akanbi
(74) *Attorney, Agent, or Firm* — BURR PATENT LAW, PLLC (57) ABSTRACT

A measuring system for acquiring measured values by scanning, including an interface for connection to a control unit of a machine. The system is arranged on a movement axis of the machine, and an object can be measured by a measuring instrument of the system. During the measurement of the object, the measuring instrument generates a measured value that is stored in a control unit, that processes and stores the measured value. The control unit has a control module that reads out a position coordinate from the machine via the interface and compares the read-out position coordinate with a specified coordinate target range, and/or compares a time of a timer with a specified point in time, and releases a trigger signal if the control module detects that the position coordinate lies in the coordinate target range and/or if the time has reached or passed the specified point in time.

18 Claims, 3 Drawing Sheets

(58) Field of Classification Search
USPC .................................................. 356/614–624
See application file for complete search history.

(56) References Cited

U.S. PATENT DOCUMENTS

| | | | | |
|---|---|---|---|---|
| 5,862,604 | A * | 1/1999 | Fuchs | G01B 7/016 |
| | | | | 33/503 |
| 6,044,569 | A * | 4/2000 | Ogihara | G01B 21/045 |
| | | | | 33/561 |
| 6,131,301 | A | 10/2000 | Sutherland | |
| 6,611,617 | B1 * | 8/2003 | Crampton | G01B 11/2518 |
| | | | | 382/153 |
| 6,806,968 | B2 | 10/2004 | Ruck | |
| 7,124,514 | B2 * | 10/2006 | McMurtry | G01B 7/012 |
| | | | | 33/559 |
| 7,367,133 | B2 | 5/2008 | Hagl et al. | |
| 9,025,855 | B1 | 5/2015 | Christoph et al. | |
| 9,077,513 | B2 | 7/2015 | Fritsch | |
| 10,107,618 | B2 | 10/2018 | Jordil et al. | |
| 10,573,010 | B2 | 2/2020 | Held | |
| 2002/0185998 | A1 | 12/2002 | Beck | |
| 2005/0166413 | A1 * | 8/2005 | Crampton | G01B 5/008 |
| | | | | 33/503 |
| 2007/0245584 | A1 * | 10/2007 | Hagl | G01B 21/045 |
| | | | | 33/561 |
| 2008/0051927 | A1 | 2/2008 | Prestidge et al. | |
| 2011/0251714 | A1 * | 10/2011 | Nishikawa | B23Q 17/22 |
| | | | | 700/174 |
| 2017/0370688 | A1 | 12/2017 | Hemmings et al. | |
| 2017/0370689 | A1 * | 12/2017 | Hemmings | G01B 5/008 |
| 2018/0017383 | A1 | 1/2018 | Sahlmann et al. | |
| 2019/0301851 | A1 * | 10/2019 | Kern | G01S 17/42 |
| 2019/0376777 | A1 * | 12/2019 | Styles | G05B 19/414 |
| 2020/0225550 | A1 | 7/2020 | Chevallier et al. | |

FOREIGN PATENT DOCUMENTS

| | | | |
|---|---|---|---|
| CN | 102326182 | A | 1/2012 |
| CN | 102902232 | A | 1/2013 |
| CN | 103608647 | A | 2/2014 |
| CN | 104602870 | A | 5/2015 |
| CN | 106091931 | A | 11/2016 |
| CN | 107543484 | A | 1/2018 |
| CN | 107883867 | A | 4/2018 |
| DE | 199 05 514 | A1 | 8/2000 |
| DE | 100 50 795 | A1 | 7/2001 |
| DE | 100 20 842 | A1 | 10/2001 |
| DE | 10 2005 011 285 | A1 | 12/2005 |
| DE | 10 2016 212 650 | A1 | 1/2018 |
| DE | 10 2018 204 696 | A1 | 10/2019 |
| JP | 2006-349547 | A | 12/2006 |
| JP | 3133056 | U | 6/2007 |
| JP | 2008-070143 | A | 3/2008 |
| WO | 2018/134585 | A1 | 7/2018 |
| WO | 2019/063911 | A | 4/2019 |

OTHER PUBLICATIONS

International Search Report and Written Opinion (Application No. PCT/EP2020/070132) dated Oct. 23, 2020 (with English translation).
International Preliminary Report on Patentability (Chapter II) (Application No. PCT/EP2020/070132) dated Oct. 28, 2021.
Chinese Office Action (with English translation), Chinese Application No. 202080059286.4, dated Jul. 4, 2022 (10 pages).
Japanese Office Action (with English translation), Japanese Application No. 2022-511363, dated Oct. 11, 2022 (13 pages).
Chinese Office Action (with English translation) dated Feb. 21, 2023 (Application No. 202080059286.4).

* cited by examiner

MEASURING SYSTEM

CROSS REFERENCE TO RELATED APPLICATIONS

This application is a continuation of International Application No. PCT/EP2020/070132 filed Jul. 16, 2020, which designated the United States, and claims the benefit under 35 USC § 119(a)-(d) of German Application No. 10 2019 122 655.4 filed Aug. 22, 2019, the entireties of which are incorporated herein by reference.

FIELD OF THE INVENTION

The present invention relates to a measuring system.

BACKGROUND OF THE INVENTION

Measuring systems for acquiring measurement values by scanning are known.

A known measuring system comprises an optical measuring instrument which is designed to be arrangeable at a movement bar of a tool or measuring machine. By way of example, a plurality of measurement values can be successively acquired in a temporal sequence by means of the optical measuring instrument. If the measuring instrument is moved during a measurement over an object to be measured, then different points of the object to be measured can be measured by the measuring instrument during the movement of said measuring instrument. By way of example, a height profile of the object to be measured is generable in this way.

It is comparatively complicated in these known measuring systems to bring the generated measurement values into correspondence with the measured points on the object, the measurement coordinates. In known measuring systems, the movement speed of the measuring instrument during the measurement correlates with a determination accuracy for the measurement point. The more accurately the measurement point should be determined, the slower the measurement, or vice versa, the faster the measurement, the less accurate the determination of the measurement point.

SUMMARY OF THE INVENTION

The present invention is based on the object of providing an alternative measuring system for acquiring measurement values by scanning.

The present invention uses as a starting point a measuring system for acquiring measurement values by scanning, the measuring system comprising an interface for connecting the measuring system to a control unit of a machine, the machine being in the form of a machine tool or a measuring machine, the measuring system comprising a measuring instrument, the measuring system, in particular the measuring instrument of the measuring system, being designed to be arrangeable at a movement bar of the machine, a measurement object being able to be measured using the measuring instrument, the measuring instrument generating a measurement value when measuring the measurement object, the measuring system comprising a controller unit, the controller unit having a memory unit for storing the measurement values acquired by the measuring system, the controller unit being able to process and store the measurement value, the measuring system comprising a time generator.

The memory unit is advantageously present as a conventional magnetic or electronic memory unit. By way of example, the memory unit is designed as an electronic data memory. By way of example, the memory unit is present as a DRAM memory unit, as a ROM memory unit or as a flash EEPROM memory unit.

The machine is present as a CNC machining center, for example. By way of example, the machine tool is designed as a turning center and/or milling center. Advantageously, the machine tool comprises a plurality of machine bars that are movable relative to one another. By way of example, the machine tool is in the form of a 3-axis machine tool or in the form of a 5-axis machine tool. By way of example, the measuring machine is in the form of a coordinate measuring machine.

By way of example, a control unit of the machine is designed as a numerical control, for example, as a CNC (computerized numerical control).

Now, a first variant of the present invention should be seen in that the measuring system, in particular, the controller unit of the measuring system, comprises a control module and the control module reads a position coordinate from the machine via the interface and compares the read position coordinate with a specified coordinate target region, wherein the control module triggers a trigger signal should the control module determine that the position coordinate is located within the coordinate target region. A second variant of the present invention should be seen in that the measuring system, in particular, the controller unit of the measuring system, comprises a control module and the control module compares a time of the time generator with a specified time and wherein the control module triggers a trigger signal should the control module determine that the time of the time generator has reached or passed the specified time. It is also advantageous that the measuring instrument compares a time of the time generator with a specified time and the measuring instrument triggers a trigger signal should the measuring instrument determine that the time of the time generator has reached or passed the specified time. It is likewise conceivable that a time of the time generator is compared with a specified time either only by way of the control module or only by way of the measuring instrument. However, it is also imaginable that both the control module and the measuring instrument compare a time of the time generator with a specified time. The measuring instrument preferably comprises a time generator.

In this context, a measuring system according to the invention may have one of the two aforementioned variants or both of the variants in combination. This renders a comparatively precise measurement of a measurement object realizable within a comparatively short measurement time.

By way of example, the control module is designed in the form of a computing unit, for example, as a microcontroller or a microprocessor.

By way of example, a start time of a measurement and a measuring duration of the measurement are known and/or specifiable to the measuring system. By way of example, the measuring system is designed to determine the specified time proceeding from the start time and the measuring duration. It is also conceivable that a start time of a measurement, a movement speed of the movement bar of the machine and a measuring path are known to the measuring system. By way of example, the measuring system is designed to determine the specified time proceeding from the start time, the movement speed of the movement bar and the measuring path. It is also imaginable that the measuring system is designed to this end, so that the specified time is able to be specified to the measuring system.

Advantageously, the measuring system is connectable to the machine by means of the interface such that, in particular, current position coordinates of the measuring instrument are readable by the measuring system. By way of example, the time generator of the measuring system and a time generator of the machine are synchronizable to one another. By way of example, a temporal retardation, for example, a delay, between a query time for a position coordinate and a reception time of the position coordinate is known to the measuring instrument.

It is also proposed that the controller unit stores the trigger signal in the memory unit together with a first measurement value acquired at the time of the trigger signal, a temporal relationship between trigger signal and the first measurement value being known to the measuring system. Advantageously, a delay or a retardation time between trigger signal and reception of the measurement value from the measuring instrument is known to the measuring system. In particular, this delay or this retardation is constant. This facilitates an assignment of the measurement value to an associated measurement point, for example a position coordinate.

By way of example, the measuring instrument terminates the measurement value acquisition after triggering the trigger signal. By way of example, the first measurement value is the chronologically last measurement value generated during the measurement. By way of example, the first measurement value is the chronologically last measurement value of the measurement processed by the controller unit.

It is further proposed that the controller unit is designed to transmit the trigger signal to the control unit of the machine via an interface, more particularly, the interface. This renders a bar movement of the machine controllable, in particular, a movement of the movement bar of the machine stoppable on the basis of the trigger signal.

It is further proposed that the interface is in the form of a standardized interface.

Advantageously, the interface is in the form of a serial interface. Advantageously, the communication between measuring system and the machine is based on a synchronous, serial protocol. It is also conceivable for the interface to be in the form of a standard interface, for example, as a standard data bus. By way of example, the interface is present as a fieldbus, for example, as a Profinet interface, as an EnDat interface or else as an Ethernet interface. By way of example, the interface is in the form of an SPI (serial peripheral interface). Moreover, it is advantageous for the interface to have a transmission channel for serial data communication with the machine. The transmission channel is advantageously in the form of a signal line. By way of example, the interface is in the form of a serial and/or parallel interface. Advantageously, the interface is present in the form of a USB interface or in the form of a FireWire interface. It is also conceivable for the interface to be present as a proprietary interface.

It was also found to be advantageous for the interface to be a wired interface. This realizes a comparatively reliable transfer path. It was likewise found to be advantageous that the interface has a transmission channel for a power supply of the control unit and a transmission channel for a measurement signal transfer.

Advantageously, the controller unit is designed to transmit the trigger signal to the machine via the interface as a standardized protocol.

Preferably, the measuring system comprises two interfaces, the measuring system transmitting the trigger signal to the control unit of the machine via a first interface and the measuring system reading position coordinates from the machine via a second interface. The first interface is advantageously present as a proprietary interface. By way of example, the first interface is designed to facilitate a serial data transfer. By way of example, the second interface is in the form of a standard interface, for example a bus interface. By way of example, the second interface is present as a USB or network interface. It is also conceivable for the first and the second interface to be present as a single interface.

Preferably, the measuring system comprises a transmitter and receiver unit in addition to the measuring instrument, the transmitter and receiver unit being designed to receive and process measurement values generated by the measuring instrument. It is conceivable that the transmitter and receiver unit has the first interface. It is also imaginable that the controller unit is a constituent part of the transmitter and receiver unit. By way of example, the transmitter and receiver unit and/or the controller unit is coupled to the measuring instrument by way of a radio connection and/or by way of an optical connection by means of a third interface.

By way of example, the transmitter and receiver unit is in the form of a control and evaluation unit for the measuring instrument. Advantageously, the control and evaluation unit controls the measuring instrument. By way of example, the control and evaluation unit is designed to evaluate measurement data from the measuring instrument, in particular, to determine a measurement value from the measurement data of the measuring instrument.

By way of example, the controller unit and/or the transmitter and receiver unit communicate with the measuring instrument by way of a wireless communication channel. By way of example, the controller unit and/or the transmitter and receiver unit communicate with the measuring instrument by means of optical signals and/or by means of radio signals. By way of example, the optical signals are infrared signals. By way of example, the radio signals are Bluetooth signals. Further, it is proposed that the transmitter and receiver unit and the measuring instrument communicate with one another by means of a radio connection. Preferably, the controller unit and/or the transmitter and receiver unit and the measuring instrument communicate by means of a WLAN interface, a Bluetooth interface and/or a mobile radio interface. By way of example, the mobile radio interface is present as an LTE interface.

It is also conceivable that the controller unit is designed as a computing unit that is separate from the measuring instrument and/or the transmitter and receiver unit, for example, as a computer. Preferably, the controller unit, as a separate computing unit, is connectable to both the machine and also the transmitter and receiver unit and/or the measuring instrument.

In an imaginable design of the measuring system, the measuring instrument comprises the controller unit and/or at least an interface, by means of which the measuring instrument is connectable to the control unit of the machine.

By way of example, the control unit of the machine and the measuring system, in particular, the measuring instrument, communicate via a wireless communication channel. By way of example, the control unit of the machine and the measuring system communicate by means of optical signals and/or by means of radio signals. By way of example, the optical signals are infrared signals. The radio signals are Bluetooth signals, for example. Further, it is proposed that the control unit of the machine and the measuring system, in particular, the measuring instrument, communicate with one another by means of a radio connection. Preferably, the control unit of the machine and the measuring system, in particular the controller unit, communicate by means of a WLAN interface, a Bluetooth interface and/or a mobile radio interface. By way of example, the mobile radio interface is present as an LTE interface.

If the controller unit is designed as a separate computing unit, the measuring system advantageously comprises a further interface, in particular, the third interface, by means of which the measuring instrument is connected to the controller unit. By way of example, the measuring instrument transmits the measurement values to the controller unit via the further interface. It is conceivable that the transmitter and receiver unit has the further interface. By way of example, the transmitter and receiver unit is physically connected to the controller unit by means of the further interface.

It is also advantageous that the measuring system is designed to read a first position coordinate acquired at the time of the trigger signal from the machine, in particular, read a position coordinate of the measuring instrument arranged at the machine, a temporal relationship between trigger signal and the first position coordinate being known to the measuring system, with the controller unit of the measuring system being designed to establish a temporal relationship between the first position coordinate and the first measurement value. This renders it possible to create a height profile of the measured measurement object.

By way of example, a delay, for example, a time lag between the output of the trigger signal by the controller unit of the measuring system to the machine and correlation of the trigger signal with a position coordinate by the machine, is known to the measuring system. Advantageously, the machine is designed to correlate the trigger signal with a position coordinate or to link the trigger signal to a position coordinate. Advantageously, this time lag is approximately constant in particular.

It is likewise advantageous that proceeding from the correlation of the first measurement value with the first position coordinate, the measuring system is designed to assign position coordinates, in particular position coordinates of the measuring instrument, to further measurement values acquired by the measuring instrument purely by virtue of a movement speed and a movement direction of the measuring instrument during or within the scope of the acquisition of the measurement values being known. This allows a comparatively precise measurement of the measurement object to be realized within a comparatively short measurement time using the measuring system.

Advantageously, the movement direction and/or movement speed of the measuring instrument is constant during the acquisition of the measurement values. By way of example, the measuring instrument is moved at a constant speed and/or in a constant direction by a movement bar or a plurality of movement bars of the machine during the acquisition of the measurement values.

Preferably, the movement direction and/or the movement speed of the measuring instrument should be seen in relation to the measurement object to be measured. Accordingly, it is conceivable that the measuring instrument is present with a fixed position relative to surroundings, for example surroundings of a machine at which the measuring instrument is arranged, during a measurement and the measurement object is moved relative to the measuring instrument and relative to the surroundings instead.

Preferably, each position coordinate assigned to a measurement value by the measuring system is a position coordinate of the measuring instrument arranged at the machine. Advantageously, the position coordinate of the measuring instrument arranged at the machine is transformable to a spatial coordinate of the measurement object, for example, by normalization. Advantageously, the spatial coordinate of the measurement object is a measurement point at which the measuring instrument has measured the measurement object and generated the measurement value thereby.

An advantageous modification of the present invention is that proceeding from the correlation of the first measurement value with the first position coordinate, the measuring system is designed to assign further position coordinates to further measurement values acquired by the measuring instrument by virtue of a spatial relationship of the acquired measurement values to one another being known to the measuring system. As a result, a corresponding position coordinate is assignable comparatively easily to a further measurement value, in particular, to all further measurement values, proceeding from the position coordinate of the first measurement value.

It was moreover found to be advantageous that proceeding from the correlation of the first measurement value with the first position coordinate, the measuring system is designed to assign further position coordinates to further measurement values acquired by the measuring instrument by virtue of a temporal relationship of the acquired measurement values to one another being known to the measuring system. Advantageously, a movement speed and movement direction of the measuring instrument between the acquisition of two different measurement values of a measurement are known to the measuring system.

Preferably, a spatial distance and/or time interval of the acquired measurement values from one another is known to the measuring system. Advantageously, a spatial relationship should be understood to mean not only a spatial distance or spatial spacing, but also a spatial direction, in particular, an associated spatial direction. By way of example, the measuring system assigns further position coordinates to further measurement values, which were acquired by the measuring instrument, on the basis of the temporal relationship, for example, a time interval, and the known movement speed and movement direction of the measuring instrument. In particular, a spatial distance and/or time interval of the acquired measurement values of a measurement is known to the measuring system. Advantageously, the measuring system generates measurement values which have a known temporal relationship with respect to one another. By way of example, the measuring system, for example the measuring instrument, generates measurement values in a spatial and/or temporal interval that is constant in particular.

Advantageously, a spatial relationship and/or a temporal relationship between the first measurement value and a further measurement value is known to the measuring system. In particular, a spatial relationship and/or a temporal relationship between the first measurement value and all further measurement values is known to the measuring system. By way of example, a movement speed and a movement direction of the movement bar of the machine, in particular of all movement bars of the machine, are known to the measuring system.

Advantageously, the measuring system is calibrated and/or normalized to a movement speed of a movement bar of the machine. In particular, the measuring system is calibrated and/or normalized to a plurality of movement speeds of a movement bar of the machine. As a result, a spatial distance of the measurement values is known to the measuring system. In particular, a spatial distance of the measurement values is known to the measuring system on the basis of a cycle time of the measurement value acquisition or measurement value generation by the measuring instrument and, for example, on the basis of the movement of the movement bar.

In an advantageous configuration of the present invention, the measuring instrument is designed as a measuring instrument that operates in contactless fashion.

By way of example, the measuring instrument is present as a measuring sensor. By way of example, the measuring instrument is designed as a confocal-chromatic distance sensor, as a laser scanner and/or as an imaging measuring instrument, for example, as a CCD sensor. By way of example, the measuring instrument is present as a line scanner. Advantageously, the measuring instrument is present as a scanning measuring instrument, for example, as a scanner. By way of example, the measuring instrument generates measurement values point-by-point, line-by-line or row-by-row during a measurement.

However, it is also imaginable that the measuring instrument is designed as a contacting measuring sensor, in particular, as a measuring sensor operating on tactile principles. By way of example, the measuring instrument is designed to determine a magnitude of deflection of a probing element of the measuring sensor operating on tactile principles and/or to determine a force of the probing element of the measuring sensor operating on tactile principles.

In an advantageous embodiment of the present invention, the measuring system is designed to carry out the following method steps in succession, in particular in the sequence specified below:
  calibrating and/or normalizing a movement speed of the measuring instrument arranged at a movement bar of the machine,
  reading, requesting and/or determining a coordinate target region and/or a specified time,
  storing the coordinate target region and/or the specified time in a memory unit,
  starting a measuring procedure or a measurement, generating measurement values by the measuring instrument of the measuring system,
  reading position coordinates of a movement bar of the machine by the control module of the measuring system and/or reading a time of the time generator of the measuring system,
  comparing the read position coordinates with the specified coordinate target region and/or comparing a time of a time generator of the measuring system with the specified time by the control module of the controller unit,
  triggering a trigger signal by the control module should the position coordinate be located in the coordinate target region and/or triggering a trigger signal by the control module should the time of the time generator have reached or passed the specified time,
  storing the trigger signal in the memory unit together with a measurement value determined at the time of the trigger signal, a temporal relationship between trigger signal and measurement value being known to the measuring system,
  transmitting the trigger signal to a control unit of the machine by the measuring system, in particular by the controller unit of the measuring system, and
  reading the bar position of a movement bar of the machine, which was stored by the machine, by the machine by way of the controller unit.

An advantageous variant of the present invention concerns a machine, more particularly, a machine tool and/or measuring machine, comprising a measuring system according to any of the embodiments specified above, wherein the machine is designed to stop a bar movement on the basis of the trigger signal of the measuring system. As a result, a measuring procedure is controllable by the measuring system.

Advantageously, the machine is designed to stop a bar movement on the basis of the trigger signal triggered by the measuring system.

A further advantageous configuration of the present invention relates to a machine, more particularly, a machine tool and/or measuring machine, as specified above, wherein the control unit of the machine stores a bar position at the time of reception of the trigger signal in a memory module of the machine in readable fashion.

Advantageously, the control unit of the machine stores a bar position at the time of reception of the trigger signal in the memory module of the machine together with the trigger signal. By way of example, the bar position at the time of reception of the trigger signal is storable, in readable fashion, in the memory module of the machine, in a manner recognizable by the measuring system.

It is also imaginable that the controller unit is present at the machine. It is also conceivable that the controller unit is a constituent part of the machine. By way of example, the controller unit is a component of the control unit. By way of example, the control unit comprises the controller unit.

In an advantageous embodiment of the present invention, the machine with the measuring system is designed to carry out the following method steps in succession, in particular, in the sequence specified below:
  calibrating and/or normalizing a movement speed of the measuring instrument arranged at a movement bar of the machine,
  reading, requesting and/or determining a coordinate target region and/or a specified time,
  storing the coordinate target region and/or the specified time in a memory unit,
  starting a measuring procedure or a measurement,
  generating measurement values by the measuring instrument of the measuring system,
  starting a movement, in particular a continuous and/or constant movement, of a movement bar by the machine,
  reading position coordinates of the movement bar of the machine and/or reading a time of the time generator of the measuring system by the control module of the measuring system,
  comparing the read position coordinates with the specified coordinate target region and/or comparing a time of a time generator of the measuring system with the specified time by the control module of the controller unit,
  triggering a trigger signal by the control module should the position coordinate be located in the coordinate target region and/or triggering a trigger signal by the control module should the time of the time generator have reached or passed the specified time,
  storing the trigger signal in the memory unit together with a measurement value determined at the time of the trigger signal, a temporal relationship between trigger signal and measurement value being known,
  transmitting the trigger signal to a control unit of the machine by the measuring system, in particular by the controller unit of the measuring system, receiving and processing the trigger signal by the control unit of the machine, stopping the bar movement of the movement bar by the control unit of the machine, reading and storing a bar position of the movement bar of the machine at the time of the trigger signal in a memory module of the machine, and reading the bar position of the movement bar, which was stored by the machine, by the machine by way of the controller unit.

BRIEF DESCRIPTION OF THE DRAWINGS

A plurality of exemplary embodiments are explained in more detail on the basis of the appended schematic drawings, with further details and advantages being specified.

DETAILED DESCRIPTION OF THE INVENTION

Figure 1:
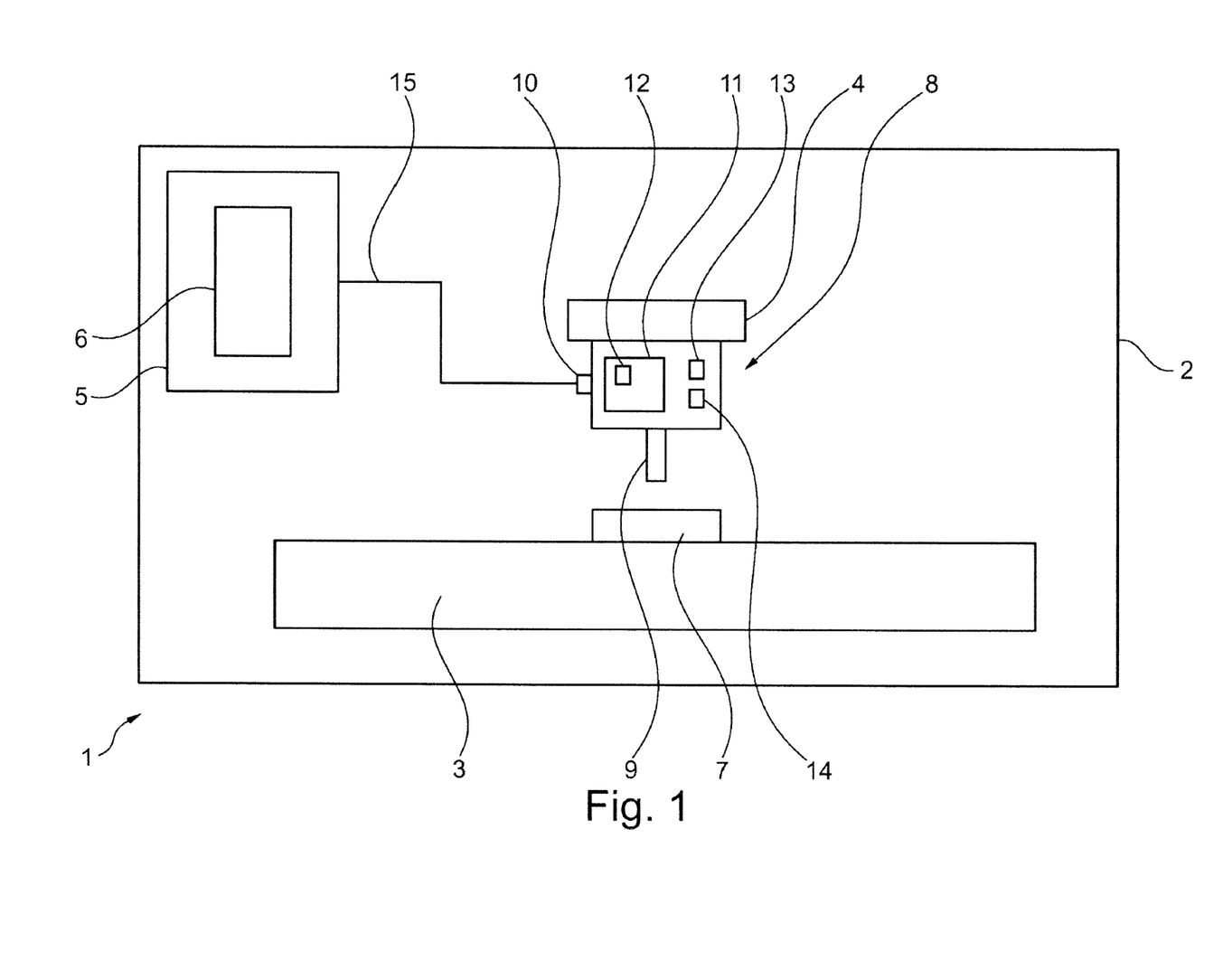
FIG. 1 shows a schematic illustration of a machine with a measuring system according to a first embodiment variant.

FIG. 1 shows a schematically illustrated machine 1 with a housing 2, a machine table 3, a movement bar 4 and a control unit 5. By way of example, the machine 1 comprises a memory module 6 which is present on the control unit 5, for example. A measurement object 7 is arranged in exemplary fashion on the machine table 3.

Advantageously, a measuring system 8 is present arranged at the machine 1. The measuring system 8 comprises a measuring instrument 9, an interface 10 and a controller unit 11. By way of example, the controller unit 11 has a control module 12. Moreover, the measuring system 8 may comprise a memory unit 13 and a time generator 14.

In the embodiment variant according to FIG. 1, the further components of the measuring system 8, such as, for example, the controller unit 11, form a separate compact unit next to the measuring instrument 9. According to FIG. 1, the further components of the measuring system 8 are designed as a compact assembly, for example, arrangeable in a single housing at the movement bar 4 of the machine 1.

By way of example, the measuring system 8 is connected by means of a transmission channel 15 to the control unit 5 of the machine 1 via the interface 10.

Figure 2:
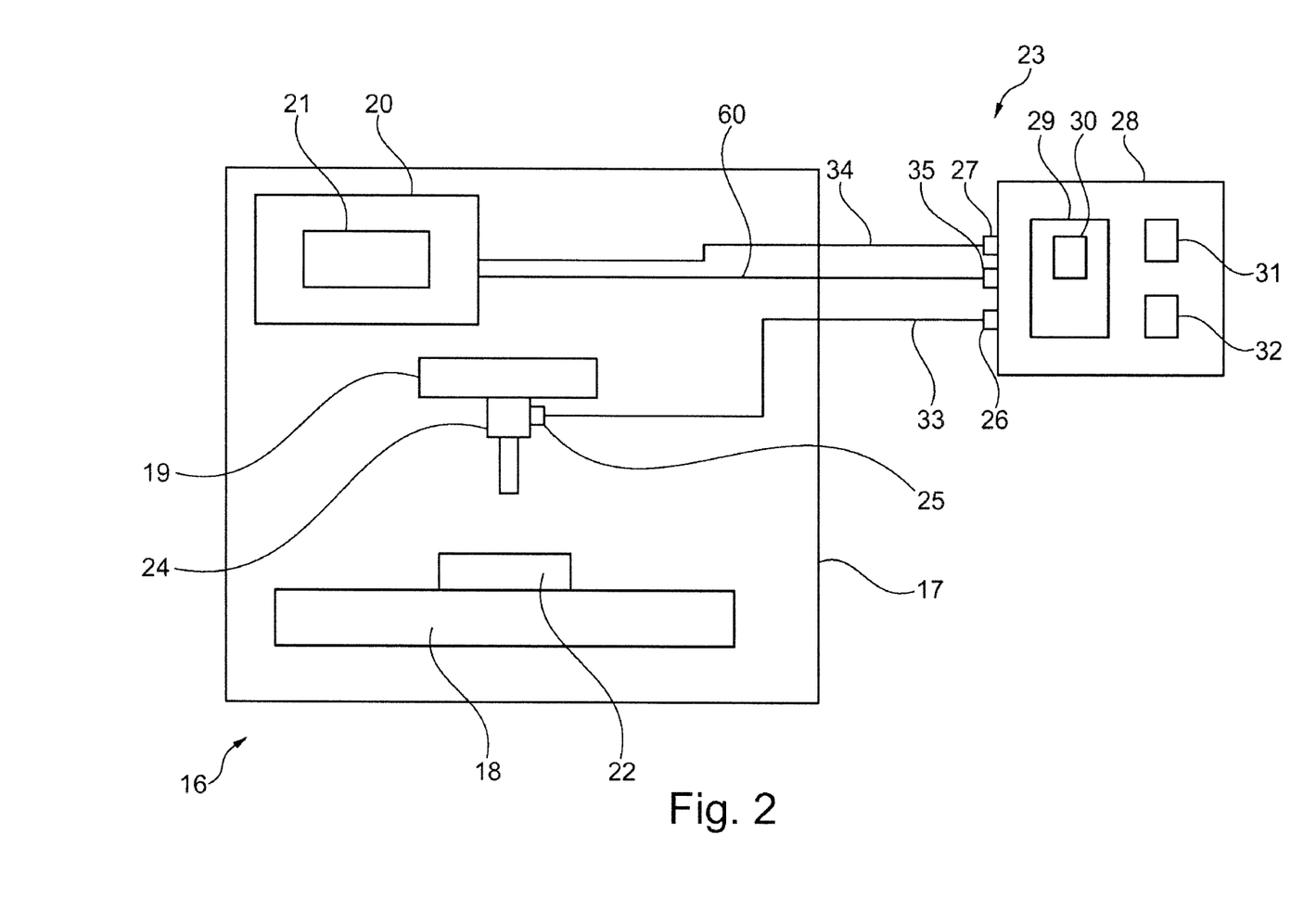
FIG. 2 shows a schematic illustration of a machine with a measuring system according to a second embodiment variant.

FIG. 2 shows, in a further embodiment variant, a machine 16 with a schematically illustrated housing 17, a machine table 18, a movement bar 19 and a control unit 20. By way of example, the machine 16 comprises a memory module 21, which is present at the control unit 20, for example. A measurement object 22 is arranged on the machine table 18 in exemplary fashion.

Advantageously, a measuring system 23 is arranged at the machine 16. The measuring system 23 comprises a measuring instrument 24, a first interface 25, a second interface 26 and for example a third interface 27. Further, the measuring system 23 comprises a transmitter and receiver unit 28, for example. By way of example, the transmitter and receiver unit 28 comprises a controller unit 29 with a control module 30. Further, the measuring system 23 may comprise a memory unit 31 and a time generator 32.

In the embodiment variant as per FIG. 2, the measuring instrument 24 is coupled to the transmitter and receiver unit 28 by means of a transmission channel 33, for example, via the interfaces 25, 26. By way of example, the transmission channel 33 is present as a wireless transmission channel. By way of example, the transmission channel 33 is designed as a radio connection or a radio channel. It is also conceivable that the transmission channel 33 is formed as an optical connection, for example, as an optical channel. Moreover, by means of the interface 28, the transmitter and receiver unit 28 is connected to the machine 16, in particular, the control unit 20 of the machine 16, via a further transmission channel 34.

According to the embodiment variant of FIG. 2, it is further imaginable that a further interface 35 is present at the transmitter and receiver unit 28, the transmitter and receiver unit 28 being able to be connected by means of the interface 35 to the machine 16 by way of a further transmission channel 60.

It is further conceivable that one of the two interfaces 27, 35 is in the form of a standard interface, for example, a USB or network interface. By way of example, this interface is designed to request position coordinates from the machine 16 by way of the controller unit 29. Further, it is imaginable that the other of the two interfaces 27, 35 is in the form of a proprietary interface. If the other interface 27, 35 is in the form of a proprietary interface, it is advantageous for the controller unit 29 to be able to communicate by way of a serial data transfer with the machine 16 by means of the proprietary interface.

Figure 3:
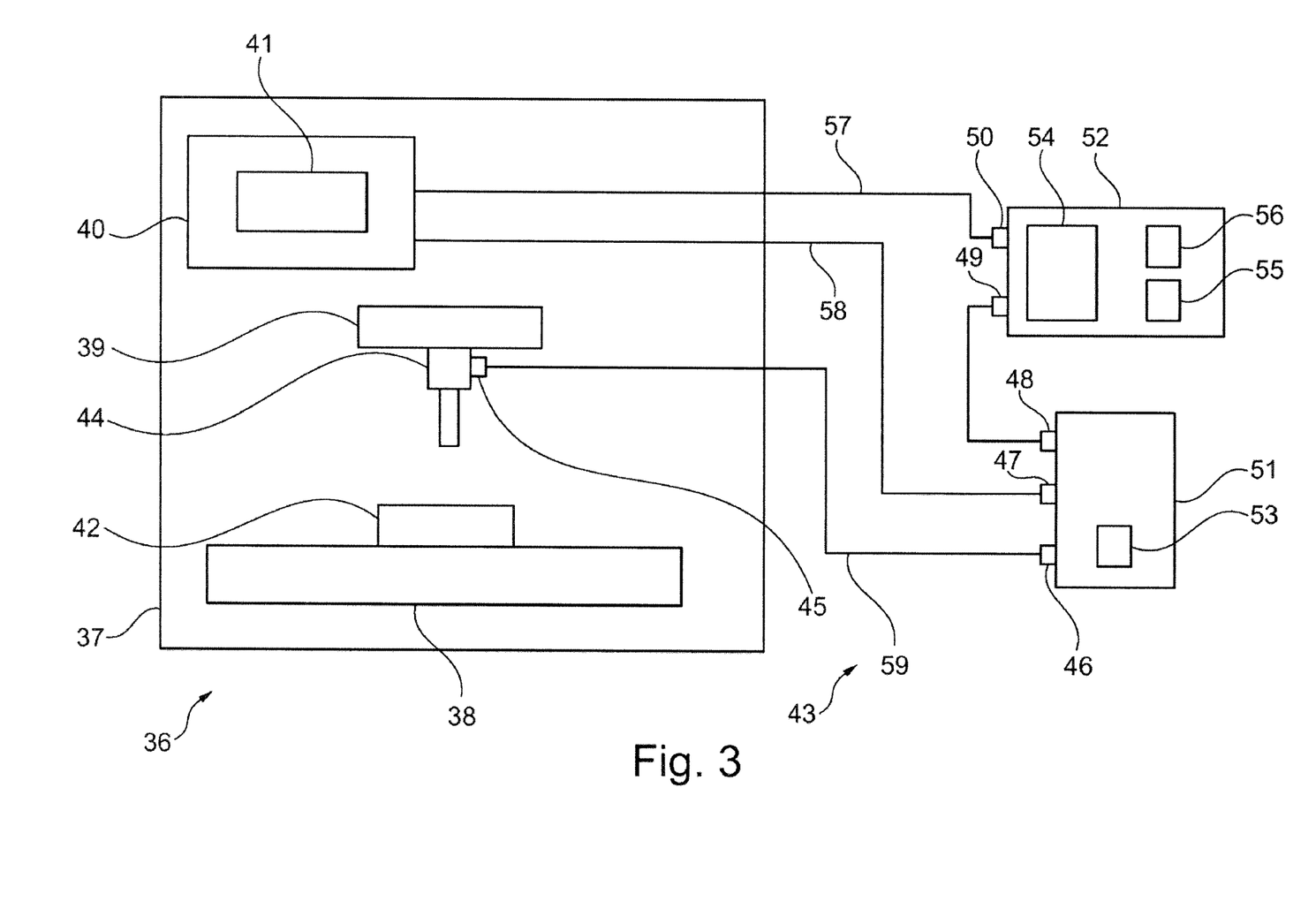
FIG. 3 shows a schematic illustration of a machine with a measuring system according to a third embodiment variant.

FIG. 3 shows, in a further embodiment variant, a machine 36 with a schematically illustrated housing 37, a machine table 38, a movement bar 39 and a control unit 40. By way of example, the machine 36 comprises a memory module 41, which is present at the control unit 40, for example. A measurement object 42 is arranged on the machine table 38 in exemplary fashion.

Advantageously, a measuring system 43 is arranged at the machine 36. The measuring system 43 comprises a measuring instrument 44 and interfaces 45 to 50. Further, the measuring system 43 comprises for example a transmitter and receiver unit 51 and a controller unit 52. Advantageously, the transmitter and receiver unit 51 and the controller unit 52 are present at a distance from one another and coupled to one another by means of the interfaces 48, 49, for example, by way of a USB connection or an Ethernet connection or network connection. By way of example, the controller unit 52 is present as a computer, for example as a laptop.

By way of example, the transmitter and receiver unit 51 comprises a time generator 53. It is also conceivable that the controller unit 52 has a time generator (not shown).

The controller unit 52 has a control module 54 and a memory unit 55, for example. It is likewise imaginable that the transmitter and receiver unit 51 comprises a memory unit (not shown).

It is further imaginable that the interface 50 is in the form of a standard interface, for example, a USB or network interface with a corresponding transmission channel 57. By way of example, this interface 50 is designed to request and read position coordinates from the machine 36 by way of the controller unit 52. It is further imaginable that the controller unit 52 comprises a time generator 56, the controller unit 52, more particularly, the control module 54, monitoring and testing whether a time of the time generator 56 has reached or passed a specified time and/or whether a read position coordinate is located in a specified coordinate target region.

The interface 47 of the transmitter and receiver unit 51 is advantageously in the form of a proprietary interface, in order to transmit a trigger signal to the control unit 40 of the machine 36 by means of a further transmission channel 58. By way of example, the trigger signal is transmittable to the machine 36 by means of a serial data transfer.

In the embodiment variant of FIG. 3, the measuring instrument 44 is coupled in exemplary fashion by means of the interfaces 45, 46 to the transmitter and receiver unit 51 via a transmission channel 59. By way of example, the transmission channel 59 is present as a wireless transmission channel. By way of example, the transmission channel 59 is in the form of a radio connection or a radio channel. It is also conceivable that the transmission channel 59 is in the form of an optical connection, for example, as an optical channel.

LIST OF REFERENCE SIGNS

1 Machine
2 Housing
3 Machine table
4 Movement bar
5 Control unit
6 Memory module
7 Measurement object
8 Measuring system
9 Measuring instrument
10 Interface
11 Controller unit
12 Control module
13 Memory unit
14 Time generator
15 Transmission channel
16 Machine
17 Housing
18 Machine table
19 Movement bar
20 Control unit
21 Memory module
22 Measurement object
23 Measuring system
24 Measuring instrument
25 Interface
26 Interface
27 Interface
28 Transmitter and receiver unit
29 Controller unit
30 Control module
31 Memory unit
32 Time generator
33 Transmission channel
34 Transmission channel
35 Interface
36 Machine
37 Housing
38 Machine table
39 Movement bar
40 Control unit
41 Memory module
42 Measurement object
43 Measuring system
44 Measuring instrument
45 Interface
46 Interface
47 Interface
48 Interface
49 Interface
50 Interface
51 Transmitter and receiver unit
52 Controller unit
53 Time generator
54 Control module
55 Memory unit
56 Time generator
57 Transmission channel
58 Transmission channel
59 Transmission channel
60 Transmission channel

The invention claimed is:

1. A measuring system for acquiring measurement values by scanning, the measuring system comprising an interface for connecting the measuring system to a control unit of a machine, the machine being in the form of a machine tool or a measuring machine, the measuring system comprising a measuring instrument, the measuring system being designed to be arrangeable at a movement bar of the machine, a measurement object being able to be measured using the measuring instrument, the measuring instrument generating a measurement value when measuring the measurement object, the measuring system comprising a controller unit, the controller unit having a memory unit for storing the measurement values acquired by the measuring system, the controller unit being able to process and store the measurement value, the measuring system comprising a time generator, wherein the measuring system comprises a control module,
wherein the control module reads a position coordinate from the machine via the interface and compares the read position coordinate with a specified coordinate target region, and
the control module triggers a trigger signal when the control module determines that the position coordinate is located within the coordinate target region, and
wherein the measuring system reads, requests and/or determines the coordinate target region and stores the coordinate target region in the memory unit of the controller unit, and afterwards starts the measurement.

2. The measuring system as claimed in claim 1, wherein the controller unit stores the trigger signal in the memory unit together with a first measurement value acquired at the time of the trigger signal, a temporal relationship between trigger signal and the first measurement value being known to the measuring system.

3. The measuring system as claimed in claim 1, wherein the controller unit of the measuring system is designed to transmit the trigger signal to the control unit of the machine via the interface.

4. The measuring system as claimed in claim 1, wherein the measuring system is designed to read a first position coordinate of the measuring instrument arranged at the machine, acquired at the time of the trigger signal, from the machine, a temporal relationship between trigger signal and the first position coordinate being known to the measuring system, with the controller unit of the measuring system being designed to establish a temporal relationship between the first position coordinate and the first measurement value.

5. The measuring system as claimed in claim 4, wherein proceeding from the correlation of the first measurement value with the first position coordinate, the measuring system is designed to assign position coordinates to further measurement values acquired by the measuring instrument purely by virtue of a movement speed and a movement direction of the measuring instrument during the acquisition of the measurement values being known.

6. The measuring system as claimed in claim 4, wherein proceeding from the correlation of the first measurement value with the first position coordinate, the measuring system is designed to assign further position coordinates to further measurement values acquired by the measuring instrument by virtue of a spatial relationship of the acquired measurement values to one another being known to the measuring system.

7. The measuring system as claimed in claim 4, wherein proceeding from the correlation of the first measurement value with the first position coordinate, the measuring system is designed to assign further position coordinates to further measurement values acquired by the measuring instrument by virtue of a temporal relationship of the acquired measurement values to one another being known to the measuring system.

8. The measuring system as claimed in claim 1, wherein the measuring instrument is designed as a measuring instrument that operates in contactless fashion.

9. The measuring system as claimed in claim 1, wherein the interface is in the form of a standardized interface.

10. A machine tool and/or measuring machine, comprising a measuring system as claimed in claim 1, wherein the machine is designed to stop a bar movement on the basis of the trigger signal.

11. The machine tool and/or measuring machine as claimed in claim 10, wherein the control unit of the machine stores a bar position at the time of reception of the trigger signal in a memory module of the machine in readable fashion.

12. The measuring system as claimed in claim 1, wherein the measuring instrument is an optical measuring instrument.

13. The measuring system as claimed in claim 1, wherein the position coordinate is stored in the memory unit before acquiring measurement values.

14. A measuring system for acquiring measurement values by scanning, the measuring system comprising an interface for connecting the measuring system to a control unit of a machine, the machine being in the form of a machine tool or a measuring machine, the measuring system comprising a measuring instrument, the measuring system being designed to be arrangeable at a movement bar of the machine, a measurement object being able to be measured using the measuring instrument, the measuring instrument generating a measurement value when measuring the measurement object, the measuring system comprising a controller unit, the controller unit having a memory unit for storing the measurement values acquired by the measuring system, the controller unit being able to process and store the measurement value, the measuring system comprising a time generator, wherein the measuring system comprises a control module,
    wherein the control module compares a time of the time generator with a specified time, and the control module triggers a trigger signal when the time of the time generator reaches or passes the specified time, and
    wherein the measuring system reads, requests and/or determines the specified time and stores the specified time in the memory unit of the controller unit, and afterwards starts the measurement.

15. The measuring system as claimed in claim 14, wherein the measuring instrument is an optical measuring instrument.

16. The measuring system as claimed in claim 14, wherein the specified time is stored in the memory unit before acquiring measurement values.

17. A measuring system for acquiring measurement values by scanning, the measuring system comprising an interface for connecting the measuring system to a control unit of a machine, the machine being in the form of a machine tool or a measuring machine, the measuring system comprising a measuring instrument, the measuring system being designed to be arrangeable at a movement bar of the machine, a measurement object being able to be measured using the measuring instrument, the measuring instrument generating a measurement value when measuring the measurement object, the measuring system comprising a controller unit, the controller unit having a memory unit for storing the measurement values acquired by the measuring system, the controller unit being able to process and store the measurement value, the measuring system comprising a time generator, wherein the measuring system comprises a control module,
    wherein the control module reads a position coordinate from the machine via the interface and compares the read position coordinate with a specified coordinate target region, and
    the control module triggers a trigger signal when the control module determines that the position coordinate is located within the coordinate target region, and the measuring instrument terminates the value acquisition after triggering the trigger signal,
    wherein the measuring system reads, requests and/or determines the coordinate target region and stores the coordinate target region in the memory unit of the controller unit, and afterwards starts the measurement,
    wherein the measuring system is designed to read a first position coordinate of the measuring instrument arranged at the machine, acquired at the time of the trigger signal, from the machine, a temporal relationship between trigger signal and the first position coordinate being known to the measuring system, with the controller unit of the measuring system being designed to establish a temporal relationship between the first position coordinate and the first measurement value, and
    wherein proceeding from the correlation of the first measurement value with the first position coordinate, the measuring system is designed to assign position coordinates to further measurement values acquired by the measuring instrument purely by virtue of a movement speed and a movement direction of the measuring instrument during the acquisition of the measurement values being known.

18. A measuring system for acquiring measurement values by scanning, the measuring system comprising an interface for connecting the measuring system to a control unit of a machine, the machine being in the form of a machine tool or a measuring machine, the measuring system comprising a measuring instrument, the measuring system being designed to be arrangeable at a movement bar of the machine, a measurement object being able to be measured using the measuring instrument, the measuring instrument generating a measurement value when measuring the measurement object, the measuring system comprising a controller unit, the controller unit having a memory unit for storing the measurement values acquired by the measuring system, the controller unit being able to process and store the measurement value, the measuring system comprising a time generator, wherein the measuring system comprises a control module,
    wherein the control module compares a time of the time generator with a specified time, and the control module triggers a trigger signal when the time of the time generator reaches or passes the specified time, and the measuring instrument terminates the value acquisition after triggering the trigger signal, wherein the measuring system reads, requests and/or determines the specified time and stores the specified time in the memory unit of the controller unit, and afterwards starts the measurement, wherein the measuring system is designed to read a first position coordinate of the measuring instrument arranged at the machine, acquired at the time of the trigger signal, from the machine, a temporal relationship between trigger signal and the first position coordinate being known to the measuring system, with the controller unit of the measuring system being designed to establish a temporal relationship between the first position coordinate and the first measurement value, and wherein proceeding from the correlation of the first measurement value with the first position coordinate, the measuring system is designed to assign position coordinates to further measurement values acquired by the measuring instrument purely by virtue of a movement speed and a movement direction of the measuring instrument during the acquisition of the measurement values being known.

* * * * *